United States Patent
Li et al.

(10) Patent No.: US 12,021,919 B2
(45) Date of Patent: Jun. 25, 2024

(54) PROCESSING METHOD AND DEVICE, ELECTRONIC DEVICE, AND COMPUTER-READABLE STORAGE MEDIUM

(71) Applicant: Lenovo (Beijing) Limited, Beijing (CN)

(72) Inventors: Zhenning Li, Beijing (CN); Hanhua Tian, Beijing (CN); Meng Luo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/550,838

(22) Filed: Dec. 14, 2021

(65) Prior Publication Data

US 2022/0321638 A1 Oct. 6, 2022

(30) Foreign Application Priority Data

Mar. 31, 2021 (CN) .......................... 202110349969.X

(51) Int. Cl.
*G06F 15/16* (2006.01)
*H04L 51/046* (2022.01)
*H04L 51/08* (2022.01)
*H04L 51/10* (2022.01)
*H04L 67/06* (2022.01)

(52) U.S. Cl.
CPC ............ *H04L 67/06* (2013.01); *H04L 51/046* (2013.01); *H04L 51/08* (2013.01); *H04L 51/10* (2013.01)

(58) Field of Classification Search
None
See application file for complete search history.

(56) References Cited

U.S. PATENT DOCUMENTS

| | | | | |
|---|---|---|---|---|
| 7,644,166 B2 * | 1/2010 | Appelman | ........ | H04M 3/42042 709/227 |
| 2017/0019459 A1 * | 1/2017 | Ou | .......................... | H04L 67/06 |
| 2019/0034656 A1 * | 1/2019 | Ow | ........................ | G06F 16/183 |
| 2019/0342239 A1 * | 11/2019 | Brandt | .................... | H04L 51/10 |
| 2020/0242085 A1 * | 7/2020 | Shi | ........................ | G06K 9/6218 |
| 2020/0380091 A1 * | 12/2020 | Bansal | ................ | H04L 63/0442 |
| 2022/0311722 A1 * | 9/2022 | Aggarwal | .......... | H04N 21/8455 |

FOREIGN PATENT DOCUMENTS

| | | | | |
|---|---|---|---|---|
| CN | 111327764 A | | 6/2020 | |
| CN | 111355651 A | | 6/2020 | |
| CN | 111740896 A | * | 10/2020 | ............ G06F 3/0486 |
| WO | WO-2019071872 A1 | * | 4/2019 | ............ G06F 3/0486 |

* cited by examiner

*Primary Examiner* — Yves Dalencourt
(74) *Attorney, Agent, or Firm* — ANOVA LAW GROUP, PLLC

(57) ABSTRACT

A processing method includes obtaining a to-be-shared file and its identification information, the identification information indicating a target object in the to-be-shared file; and in response to obtaining a sharing operation that satisfies a condition, sharing the to-be-shared file from a sending terminal to a receiving terminal to cause the receiving terminal to output at least the target object obtained by processing the to-be-shared file.

20 Claims, 10 Drawing Sheets

Manual Marks

Second Terminal

Second Terminal

PROCESSING METHOD AND DEVICE, ELECTRONIC DEVICE, AND COMPUTER-READABLE STORAGE MEDIUM

CROSS-REFERENCES TO RELATED APPLICATION

This application claims priority to Chinese Patent Application No. 202110349969.X, filed on Mar. 31, 2021, the entire content of which is incorporated herein by reference.

FIELD OF TECHNOLOGY

The present disclosure relates to the fields of computer and information processing and, more specifically, to a processing method and device, an electronic device, and a computer-readable storage medium.

BACKGROUND

Instant messaging (IM) is a service on a terminal that allows two or more people to use the Internet to exchange text messages, files, voice and video in real time.

When user A needs to send original information to user B, and at the same time, send the points of interest in the original information to user B, at least one focus information needs to be cut out from the original information based on at least one point of interest. In this case, user A needs to perform at least two send operations, once for sending the original information to user B, and at least once for sending follow-up information cut from the original information to user B separately, such that user B can view the original information and the point of interest information. Therefore, a user needs to perform at least two send operations. In particular, when there are many points of interest, several send operations need to be performed, which is inconvenient to users.

BRIEF SUMMARY OF THE DISCLOSURE

An aspect of the present disclosure provides a processing method. The processing method includes obtaining a to-be-shared file and its identification information, the identification information being used to indicate a target object in the to-be-shared file, and in response to obtaining a sharing operation that satisfies a condition, sharing the to-be-shared file from a sending terminal to a receiving terminal to cause the receiving terminal to output at least the target object obtained by processing the to-be-shared file.

Another aspect of the present disclosure provides a processing device. The processing device includes a first acquisition module configured to obtain a to-be-shared file and its identification information, the identification information being used to indicate a target object in the to-be-shared file; and a sharing module configured to, in response to obtaining a sharing operation that satisfies a condition, share the to-be-shared file from a sending terminal to a receiving terminal to cause the receiving terminal to output at least the target object obtained by processing the to-be-shared file.

Another aspect of the present disclosure provides a processing device. The processing device a processor and a memory storing program instructions. When being executed by the processor, the program instructions cause the processor to obtain a to-be-shared file and its identification information, the identification information being used to indicate a target object in the to-be-shared file, and share the to-be-shared file from a sending terminal to a receiving terminal to cause the receiving terminal to output at least the target object obtained by processing the to-be-shared file in response to obtaining a sharing operation that satisfies a condition.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the following descriptions, the phrase "some embodiments" describe a subset of all possible embodiments. However, it may be understood that the phrase "some embodiments" may be the same subset or different subsets of all the possible embodiments, and may be combined with each other without conflict.

Terms of "first\second\third" of embodiments of the present disclosure only distinguish similar objects, and does not represent a specific order of objects. The specific order or sequence of the "first\second\third" is allowed to be interchangeable. The objects distinguished by "first\second\third" are interchangeable under an appropriate situation. As such, embodiments of the present disclosure described here may describe sequence embodiments in addition to the drawings or described sequences.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure.

Figure 1:
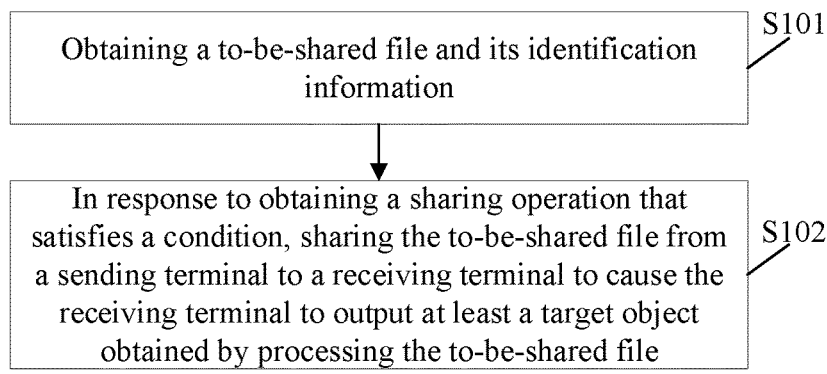
FIG. 1 is a flowchart of a processing method according to an embodiment of the present disclosure.

Embodiments of the present disclosure provide a processing method, which can be applied to a processing device. The control provided in the embodiments of the present disclosure can be implemented by a computer program. When the computer program is executed, each process in the control method provided in the embodiments of the present disclosure can be performed. In some embodiments, the computer program can be executed by a processor in the processing device. FIG. 1 is a flowchart of a processing method according to an embodiment of the present disclosure. The method will be described in detail below.

S101, obtaining a to-be-shared file and its identification information.

In some embodiments, the identification information may be used to indicate a target object in the to-be-shared file.

In the embodiments of the present disclosure, obtaining the to-be-shared file and its identification information may be implemented by a terminal, which can be a sending terminal of the to-be-shared file. In practical applications, the terminal may be a mobile terminal, for example, a mobile terminal with wireless communication capabilities, such as a mobile phone, iPad, notebook computer, wearable smart watch, etc., or a terminal device with computing functions that is inconvenient to move, such as a desktop computer.

The to-be-shared file may be an image file, a voice file, and a document. When the to-be-shared file is a to-be-shared image, the identification information may be a rectangle or an arrow edited on the to-be-shared image, or it may be text information that is independent of the to-be-shared image and used to identify the target object. The target object may be a specific object identified by the identification information in the to-be-shared image, or an image area selected by the user, for example, the target object may be a person, a car, a building, etc. in the to-be-shared image. When the to-be-shared file is a to-be-shared voice clip, the identification information may be a time node edited on the to-be-shared voice clip, or it may be text information that is independent of the to-be-shared voice clip and used to identify the target object. The target object may be an audio clip of a user in the to-be-shared voice clip, an audio clip related to a specified content in the to-be-shared voice clip, or an audio clip selected by the user. When the to-be-shared file is a to-be-shared document, the identification information may be a rectangle, a paragraph mark, etc. edited in the to-be-shared document, or it may be text information that is independent of the to-be-shared document and used to identify the target object. The target object may be a specific text in the to-be-shared document, or a text segment related to a specified content in the to-be-shared document, or a text segment selected by the user.

In the embodiments of the present disclosure, the to-be-shared file may be pre-stored in a storage area of the terminal, or the to-be-shared file may be obtained in real time by the user using an application (APP) installed on the terminal, such as using a camera APP to capture the to-be-shared image in real time. Alternatively, the to-be-shared file may be obtained by the terminal from other terminals.

S102, in response to obtaining a sharing operation that satisfies a condition, sharing the to-be-shared file from a sending terminal to a receiving terminal to cause the receiving terminal to output at least the target object obtained by processing the to-be-shared file.

After obtaining the to-be-shared file and its identification information, if the terminal detects a touch operation of the user clicking on a "share" or a "send" button, or when the other trigger conditions for triggering the sharing operations are detected, the terminal can be determined as obtaining the sharing operation that satisfies the condition. Subsequently, in response to the sharing operation, the terminal may share the to-be-shared file from the sending terminal to the receiving terminal.

In some embodiments, the terminal (i.e., the sending terminal) may process the to-be-shared file locally to obtain the target object indicated by the identification information based on the identification information, and share the processed target object with another terminal (i.e., the receiving terminal). Or, the sending terminal may first share the to-be-shared file to the receiving terminal, and the receiving terminal may process the to-be-shared file to obtain the target object indicated by the identification information based on the identification information. Or, the sending terminal may first share the to-be-shared file to an intermediate terminal (such as a server). The server may process the shared file to obtain the target object indicated by the identification information based on the identification information, and then the server may share the target object with the receiving terminal. In practice, whether at least one of the sending terminal, the server, or the receiving terminal is processing the to-be-shared file to obtain the target object may be determined based on actual conditions, which is not limited in the embodiments of the present disclosure.

After the receiving terminal receives the target object from the sending terminal or the server, or after the receiving terminal processes the target object, at least the target object may be output at the receiving terminal. For example, when user A uses an instant messaging APP to share a car image area in a to-be-shared file image with user B, at least the car image area can be output at the receiving terminal. In addition, image areas corresponding to other objects in the to-be-shared file, such people, buildings, etc., may also be output. Further, the to-be-shared file may also be output.

In other embodiments, while outputting the target object at the receiving terminal, for the convenience of the user at the sending terminal to view the shared target object, at least the target object maybe output at the sending terminal, such that the user at the sending terminal can view the shared target object, and determine whether it has been shared correctly.

The processing method provided by the embodiments of the present disclosure includes obtaining the to-be-shared file and it identification information, where the identification information can be used to indicate the target object in the to-be-shared file; and in response to obtaining a sharing operation that satisfies a condition, sharing the to-be-shared file from the sending terminal to the receiving terminal to cause the receiving terminal to output at least the target object obtained by processing the to-be-shared file. Through this method, a sharing operation based on the sending terminal can be realized, and at least the target object in the to-be-shared file can be output at the receiving terminal, which reduced the number of user operations at the receiving terminal.

In some embodiments, one of the sending terminal, the server, or the receiving terminal may be set to process the to-be-shared file. When the sending terminal is set to process the to-be-shared file, the process at S102 may be implemented through the following process.

S102A, processing the to-be-shared file at the sending terminal and sharing it to the receiving terminal to cause the receiving terminal to output at least the target object obtained by processing the to-be-shared file.

Figure 2A:
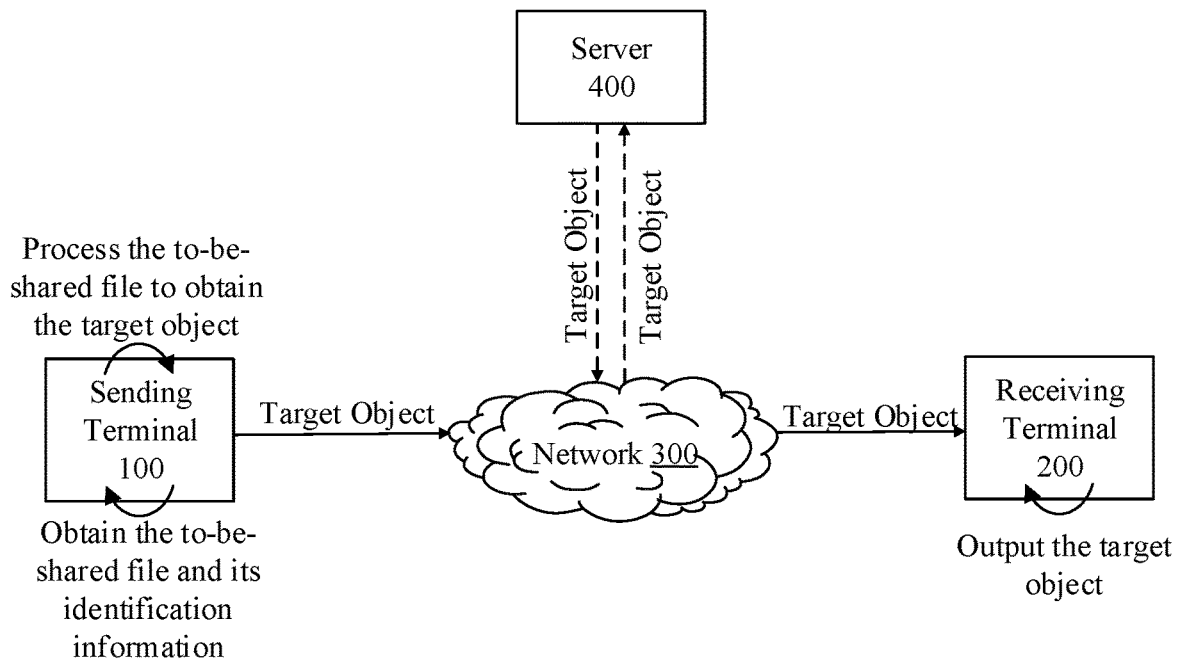
FIG. 2A is a schematic diagram of a network architecture of the processing method according to an embodiment of the present disclosure.

FIG. 2A is a schematic diagram of a network architecture of the processing method according to an embodiment of the present disclosure. As shown in FIG. 2A, the network architecture includes a sending terminal 100, a receiving terminal 200, a network 300, and a server 400. The sending terminal 100, the receiving terminal 200, and the server 400 are connected to each other through the network 300, which can be a wide area network or a local area network, or a combination of the two, using wireless or wired links to realize data transmission.

In an application scenario of the network architecture, the sending terminal 100 is configured to obtain the to-be-shared file and its identification information, process the to-be-shared file to obtain the target object, and send the target object to the receiving terminal 200. The receiving terminal 200 is configured to output the target object after receiving the target object. In some embodiments, the sending terminal 100 may also send the unprocessed to-be-shared file to the receiving terminal 200, and the receiving terminal 200 may output the to-be-shared file while outputting the target object. In the implementation shown in FIG. 2A, the sending terminal 100 and the receiving terminal 200 can directly transmit based on the network 300. In another implementation, the sending terminal 100 may send the target object to the server 400, and then the server 400 may send the received target object to the receiving terminal 200. The sending terminal 100 and the receiving terminal 200 may use the server 400 for indirect transmission (shown by the dotted lines in FIG. 2).

Take the use of the instant messaging APP to share an image described above as an example. After the sending terminal obtains the to-be-shared image, the to-be-shared image can be processed, and the target object of a car indicated by the identification information in the to-be-shared image can be obtained. Subsequently, the sending terminal sends the target object to the receiving terminal, such that the receiving terminal can output at least the target object, that is, the car.

When the server is set to process the to-be-shared file, the process at S102 may be implemented through the following process.

S102B, sending the to-be-shared file from the sending terminal to the server for process and then sharing it to the receiving terminal to cause the receiving terminal to output at least the target object obtained by processing the to-be-shared file.

Figure 2B:
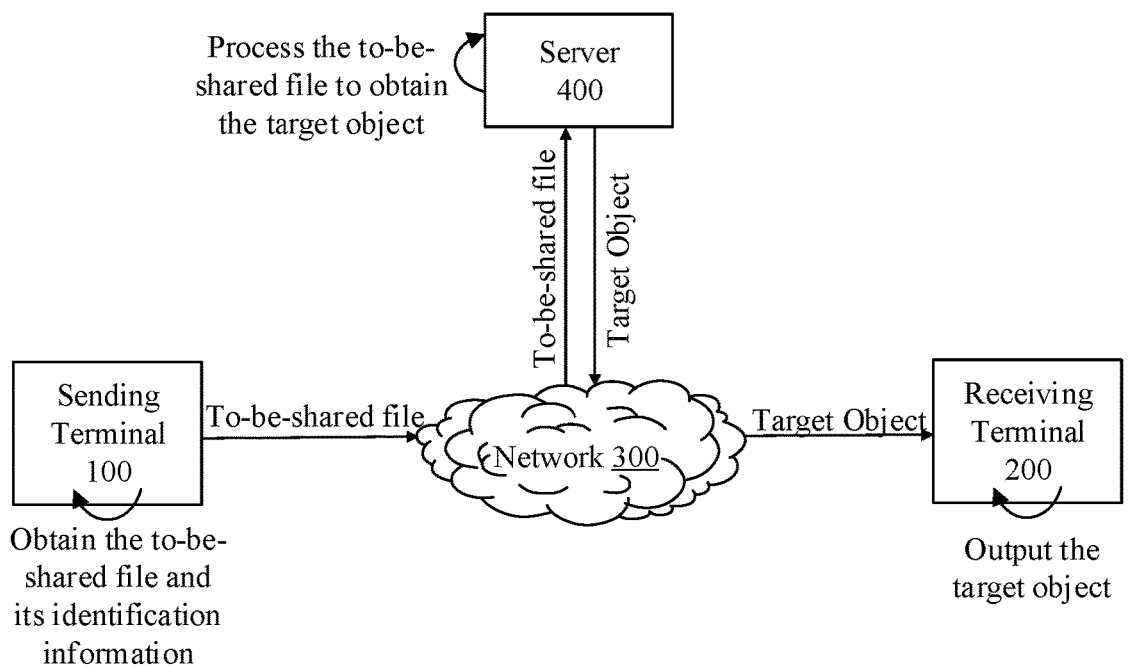
FIG. 2B is a schematic diagram of another network architecture of the processing method according to an embodiment of the present disclosure.

FIG. 2B is a schematic diagram of another network architecture of the processing method according to an embodiment of the present disclosure. As shown in FIG. 2B, the network architecture includes a sending terminal 100, a receiving terminal 200, a network 300, and a server 400. The sending terminal 100, the receiving terminal 200, and the server 400 are connected to each other through the network 300, which can be a wide area network or a local area network, or a combination of the two, using wireless or wired links to realize data transmission.

In an application scenario of the network architecture, the sending terminal 100 is configured to obtain the to-be-shared file and its identification information, and send the to-be-shared file to the server 400. The server 400 is configured to process the to-be-shared file to obtain the target object, and then send the target object to the receiving terminal 200. The receiving terminal 200 is configured to output the target object after receiving the target object. In some embodiments, the server 400 may also send the unprocessed to-be-shared file to the receiving terminal 200, and the receiving terminal 200 may output the to-be-shared file while outputting the target object.

Continue to take the use of the instant messaging APP to share an image described above as an example. After the sending terminal obtains the to-be-shared image, the to-be-shared image is sent to the server. The server processes the to-be-shared image to obtain the target object of a car indicated by the identification information in the to-be-shared image. The server then sends the target object to the receiving terminal, such that the receiving terminal can output at least the target object, that is, the car.

When the receiving terminal is set to process the to-be-shared file, the process at S102 may be implemented through the following process.

S102C, processing the to-be-shared file at the receiving terminal after the to-be-shared file is shared from the sending terminal to the receiving terminal to cause the receiving terminal to output at least the target object obtained by processing the to-be-shared file.

Figure 2C:
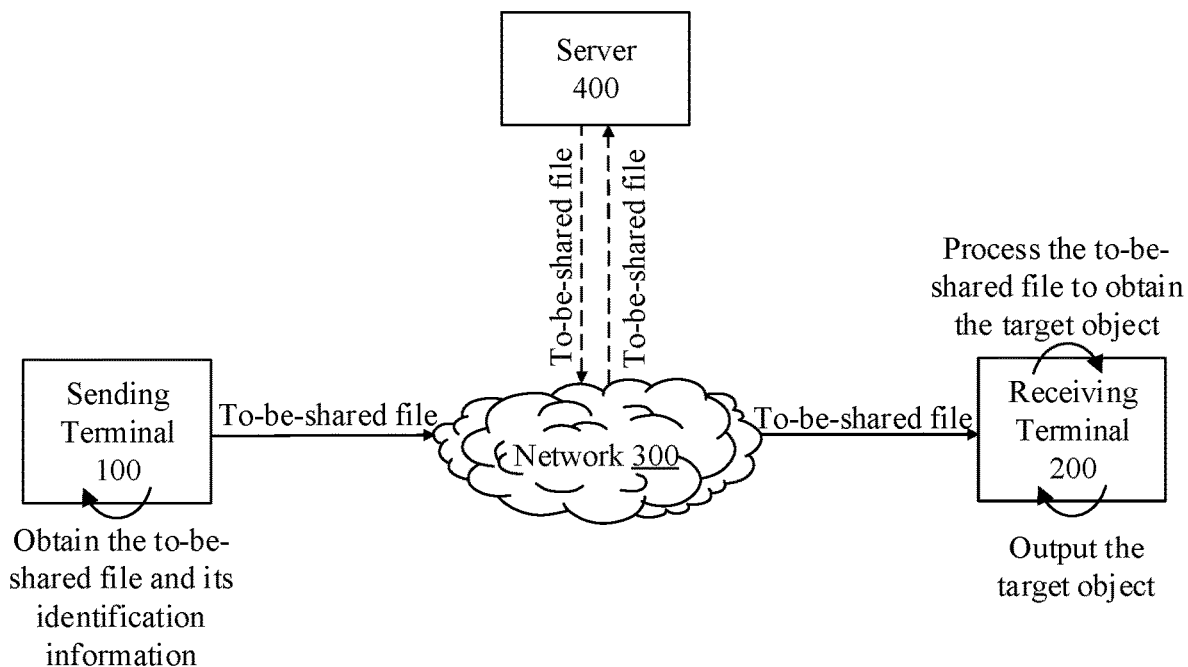
FIG. 2C is a schematic diagram of another network architecture of the processing method according to an embodiment of the present disclosure.

FIG. 2C is a schematic diagram of another network architecture of the processing method according to an embodiment of the present disclosure. As shown in FIG. 2C, the network architecture includes a sending terminal 100, a receiving terminal 200, a network 300, and a server 400. The sending terminal 100, the receiving terminal 200, and the server 400 are connected to each other through the network 300, which can be a wide area network or a local area network, or a combination of the two, using wireless or wired links to realize data transmission.

In an application scenario of the network architecture, the sending terminal 100 is configured to obtain the to-be-shared file and its identification information, and send the to-be-shared file to the receiving terminal 200. The receiving terminal 200 is configured to process the to-be-shared file to obtain the target object, and then output the target object. In some embodiments, the sending terminal 100 may also send the unprocessed to-be-shared file to the receiving terminal 200, and the receiving terminal 200 may output the to-be-shared file while outputting the target object. In the implementation shown in FIG. 2C, the sending terminal 100 and the receiving terminal 200 can directly transmit based on the network 300. In another implementation, the sending terminal 100 may send the target object of the to-be-shared file to the server 400, and then the server 400 may send the received to-be-shared file to the receiving terminal 200. The sending terminal 100 and the receiving terminal 200 may use the server 400 for indirect transmission.

Continue to take the use of the instant messaging APP to share an image described above as an example. After obtaining the to-be-shared image, the sending terminal sends the to-be-shared image to the receiving terminal. The receiving terminal processes the to-be-shared image to obtain the target object of a car indicated by the identification information in the to-be-shared image, and then outputs at least the target object, that is, the car.

In the network architectures shown in FIG. 2A to FIG. 2C, the to-be-shared file is pre-set to be processed by the sending terminal, the server, or the receiving terminal. After the setting is complete, it may be fixed. When processing the to-be-shared file, it can be processed based on the set processing terminal. In practical applications, there may be a situation where a certain terminal has a high degree of program concurrency within a period of time, and the memory processing speed is slow. At this time, if the processing terminal is still processing the to-be-shared file, it will further increase the concurrency of the processing terminal and affect the processing speed. Based on this, in the embodiments of the present disclosure, at least one of the sending terminal, the server, or the receiving terminal may dynamically process the to-be-shared file. At this time, the process at S102 may be implemented through the following processes.

S102D, obtaining first reference information if there is a first communication connection between the sending terminal and the receiving terminal, and determining to process the to-be-shared file by using the sending terminal and/or the receiving terminal based on at least the first reference information to cause the receiving terminal to output at least the target object.

In some embodiments, the first reference information may at least indicate configuration parameters and/or operating parameters of the sending terminal and/or the receiving terminal.

When a direction connection is established between the sending terminal and the receiving terminal, for example, when there is a first communication connection between the sending terminal and the receiving terminal, at this time, the sending terminal may obtain the first reference information and determine which terminal will process the to-be-shared file based on the first reference information. In actual implementation, whether the sending terminal, the receiving terminal, or the sending terminal and the receiving terminal cooperatively process the to-be-shared file may be determined based on the configuration parameters of the sending terminal, the configuration parameters of the receiving terminal, the configuration parameters of the sending terminal and the configuration parameters of the receiving terminal, the operating parameters of the sending terminal, the operating parameters of the receiving terminal, the operating parameters of the sending terminal and the operating parameters of the receiving terminal, the configuration parameters and the operating parameters of the sending terminal, the configuration parameters and the configuration parameters of the receiving terminal, or the configuration parameters and the operating parameters of the sending terminal and the configuration parameters and the operating parameters of the receiving terminal. For example, the sending terminal may be a camera with Bluetooth function, which only has the function of capturing images and cannot process the captured images. The Bluetooth function can be used to transfer the to-be-shared images to s smart terminal with processing capabilities. The to-be-shared images can be processed at the smart terminal to obtain the target object, and at least the target object can be output on the smart terminal.

In some embodiments, the configuration parameters may be the static properties of the sending terminal and the receiving terminal, such as the model of the central processing unit (CPU), which may be unrelated to the current operating state of the sending terminal and the receiving terminal. The operating parameters may be the dynamic properties of the sending terminal and the receiving terminal, such as CPU usage, which may be related to the current operating state of the sending terminal and the receiving terminal.

S102E, obtaining second reference information if the sending terminal and the receiving terminal communicate through the server, and determining to process the to-be-shared file by using at least one of the receiving terminal, the server, or the receiving terminal based on the second reference information to cause the receiving terminal to output at least the target object.

In some embodiments, the second reference information may at least indicate the configuration parameters and/or the operating parameters of at least one of the receiving terminal, the server, or the receiving terminal.

When a communication connection relationship is established between the sending terminal and the receiving terminal through the server, the sending terminal may obtain the second reference information, and determine which terminal will process the to-be-shared file based on the second reference information. In actual implementation, whether the sending terminal, the server, the receiving terminal, the sending terminal and the server cooperatively, the sending terminal and the receiving terminal cooperatively, or the sending terminal, the server, and the receiving terminal cooperatively process the to-be-shared file may be determined based on the configuration parameters of at least one of the sending terminal, the server, or the receiving terminal, the operating parameters of at least one of the sending terminal, the server, or the receiving terminal, the configuration parameters and the operating parameters of at least one of the sending terminal, the server, or the receiving terminal. For example, if the CPU usage of the sending terminal has reached 50%, in order to improve processing efficiency, the sending terminal can be used to process part of the to-be-shared file to obtain an intermediary processing result. The intermediary processing result can be sent to the server, and the server can continue to process the intermediary processing result to obtain the target object. The server can send the processed target object to the receiving terminal, and the receiving terminal can output at least the target object.

In some embodiments, the configuration parameters may be static properties of the sending terminal, the server, and the receiving terminal, and may be unrelated to the operating state of the sending terminal, the server, and the receiving terminal. The operating parameters may be the dynamic properties of the sending terminal, the server, and the receiving terminal, which may be related to the operating state of the sending terminal, the server, and the receiving terminal.

In the embodiments of the present disclosure, the processing terminal for processing the to-be-shared file may be dynamically determined based on the configuration parameters and/or the operating parameters of the sending terminal, the receiving terminal, and the server, which can speed up the processing speed and improve the processing efficiency.

In some embodiments, the process at S101 may be implemented through the following process.

S101A, obtaining the identification information by identifying editing information of the content carried by the to-be-shared file.

When the identification information is included in the to-be-shared file, after the to-be-shared file is obtained, the to-be-shared file may be identified to obtained the identification information. For example, user A uses a circle to identify a target object on an image, and uses the circle and the image as a whole as the to-be-shared image. After the sending terminal obtains the to-be-shared image, the sending terminal may identify the to-be-shared image and obtain the identification information.

In some embodiments, the process at S101 may be implemented through the following process.

S101B, analyzing obtained description information for the to-be-shared file or interaction data between the sending terminal and the receiving terminal to obtain the identification information.

When the identification information is not included in the to-be-shared file, the sending terminal may separately obtain the to-be-shared file and the description information for the to-be-shared file. For example, the sending terminal may obtain the to-be-shared image, obtain the description information of "the point of interest is the car in the image" for the image, and obtain that the identification information indicates the car is the object in the to-be-shared image based on the description information. Alternatively, the sending terminal may separately obtain the to-be-shared file and the interaction data between the sending terminal and the receiving terminal. For example, user A and user B are using the instant messaging APP to talk about the topic of "cars", and user A pre-shares an image of a car with user B. At this time, the sending terminal may obtain the to-be-shared image. Based on the context of the interaction between the sending terminal and the receiving terminal, the sending terminal can learn that the identification information obtained for the to-be-shared image indicate the car is the object in the to-be-shared image.

In actual implementation, the identification information may be obtained from the editing information for editing the content of the to-be-shared file, the description information for the to-be-shared file other than the to-be-shared file, or the interactive data between the sending terminal and the receiving terminal. In addition, the identification information may also be obtained from a combination of the methods described above. Further, the identification information may also be obtained by using other methods, such as obtaining the identification information based on the line of sight of the sending terminal user to determine the point of interest, which are not limited in the embodiments of the present disclosure.

In some embodiments, processing the to-be-shared file in the processes of S102A to S102E may be implemented as determining position information of the target object in the to-be-shared file based on the identification information.

For example, based on the identification information, the sending terminal may determine the target object indicated by the identification information in the to-be-shared image, and determine the position information of the target object "car" in the to-be-shared image. The position information may refer to the position information of the target object in the to-be-shared file, and may not refer to the actual geographic position information. When there is only one "car" object in the to-be-shared image, the sending terminal may process a target object, and the receiving terminal may receive and output the target object.

In some embodiments, processing the to-be-shared file in the processes of S102A to S102E may be implemented as determining multiple pieces of position information of the target objects in the to-be-shared file based on the identification information, and associating the multiple pieces of position information in a first association manner.

When there are multiple "car" objects in the to-be-shared image at the same time, the sending terminal may be determined the positions of multiple "cars" in the to-be-shared image based on the identification information. In this case, the sending terminal may send the multiple target objects obtained through processing to the receiving terminal. If the sending terminal does not set the output method of the multiple target objects, the receiving terminal may output all target objects at once, or randomly output one target object, or output each target object in the order of receiving, or output each target object in the order of the file size of the multiple target objects.

In another processing method, if multiple pieces of position information of the target objects are determined in the to-be-shared file based on the identification information, the sending terminal may further associate the multiple pieces of position information based on the first association manner to obtain multiple associated target objects. For example, the first association manner may include sorting information and interval information, and the multiple target objects may be associated in a set interval or a set order.

In some embodiments, processing the to-be-shared file in the processes of S102A to S102E may be further implemented as performing editing on the to-be-shared file based on the identification information to obtain the target object.

In some embodiments, the sending terminal may also edit the to-be-shared file to obtain the target object. For example, based on the identification information, the to-be-shared image may be cropped to obtain an image area, and the object in the image area may be the target object indicated by the identification information.

In some embodiments, processing the to-be-shared file in the processes of S102A to S102E may be further implemented as searching for a matching object locally or on the cloud based on the identification information to obtain the target object.

In some embodiments, when the target object indicated by the identification information in the to-be-shared file is a link, or the target object cannot be matched in the to-be-shared file, or the target object in the to-be-shared file does not meet the requirements, the matching object may be searched locally or on the cloud based on the identification information to obtain the target object. For example, for the target object "car" in the to-be-shared image, the identified "car" is unclear or the to-be-shared image does not include part of the car. At this time, based on the identification information, the "car" object that matches the identification information can be searched locally or on the cloud and used as the target object.

In some embodiments, processing the to-be-shared file in the processes of S102A to S102E may be further implemented as performing editing on the to-be-shared file or searching outside the to-be-shared file based on the identification information, and if multiple target objects are obtained, associating the multiple target objects in a second association manner.

When editing the to-be-shared file, if there are multiple "car" objects in the to-be-shared image at the same time, the sending terminal may edit the to-be-shared image based on the to-be-shared file, and multiple target objects may be obtained. Or, multiple "car" objects may be identified when searching outside the to-be-shared image (locally or on the cloud), and multiple target objects may be obtained. In this case, the sending terminal may send the multiple target objects obtained through processing to the receiving terminal. If the sending terminal does not set the output method of multiple target objects, the receiving terminal may output all target objects at once, or randomly output one target object, or output each target object in the order of receiving, or output each target object in the order of the file size of the multiple target objects.

In another processing method, if multiple target objects are determined based on the identification information, the sending terminal may perform further association processing to associate the multiple target objects based on the second association manner to obtain multiple associated target objects. For example, the second association manner may include sorting information and interval information, and the multiple target objects may be associated in a set interval or a set order.

In some embodiments, processing the to-be-shared file in the processes of S102A to S102E may be further implemented as identifying the identification information and determining a to-be-matched feature; matching the to-be-matched feature with the object included in the to-be-shared file to obtain a matching result; and determining the object whose matching result is a successful match as the target object indicated by the identification information.

In some embodiments, the to-be-matched feature may be determined by the file property information of the to-be-shared file, and the to-be-matched feature may correspond to one of an image feature, a sound features, and a text feature. For example, when processing the to-be-shared image, the identification information may be text information of "sharing the car in the to-be-shared image with user B." The sending terminal may recognize the identification information, determine that the to-be-matched feature is the feature corresponding to "car", match the to-be-matched feature with the object included in the to-be-shared image, successfully match the "car" object, and determine the matched "car" object as the target object indicated by the identification information.

In some embodiments, the process at S102 may be implemented in at least the following methods.

In the first implementation method, the receiving terminal may directly output the target object based on at least a target file indicating the target object, and/or output the identification information in the to-be-shared file based on the position information.

In this implementation method, the receiving terminal may directly output the target object after receiving the target object obtained by processing the to-be-shared file, or output the target object in the to-be-shared file based on the position information. This implementation method allows the user to automatically receive and output the target object without performing any operations. However, when a user is viewing other information, this method will affect the viewing of other information.

In the second implementation method, the target object may be directly output based on the identification information and/or the obtained output instruction for the target object, and/or output the target object in the to-be-shared file based on the position information.

In this implementation method, after receiving the target object by processing the to-be-shared file, the receiving terminal may not immediately output the target object, instead, it may carry the output condition based on the identification information. When the output condition is satisfied, or when an output instruction provided by the user is received, the target object may be directly output, or the target object may be output in the to-be-shared file based on the position information. This implementation method can realize automatic output when outputting the target object based on the identification information. However, similar to the first implementation method, the user's current viewing of other information may be interrupted. When outputting the target object based on the output instruction, the information currently being viewed by the user may not be affect after receiving the target object, but when outputting the target object, the user needs to provide an output instruction.

In the third implementation method, the configuration parameters and the operating parameters of the receiving terminal may be obtained, and the target object may be directly output based on the configuration parameters and the operating parameters, and/or the target object in the to-be-shared file may be output based on the position information.

In this implementation method, the sending terminal may determine the output method of the target object based on the configuration parameters and the operating parameters of the receiving terminal. Combined with the actual application scenarios, when the receiving terminal is viewing other information, the target object may not be output first, and the target object may be automatically output after the user is done viewing the other information, which realizes automatic output without affecting the user's current viewing information at the same time.

In the embodiments of the present disclosure, when the sending terminal or the server processes the to-be-shared file, and the information received by the receiving terminal only includes the target object, at this time, the receiving terminal may only output the target object. If there are multiple target objects, the multiple target objects may be output in an association manner of the multiple target objects.

When the sending terminal or the server processes the to-be-shared file, in additional to the target object, other information, such as the to-be-shared file and/or the identification information may also need to be sent to the receiving terminal. Multiple target objects, or the target object and other information may be sent to the receiving terminal as a target file. Alternatively, the receiving terminal may process the to-be-shared file, and the information obtained by the receiving terminal may include other information other than the target object, such as the to-be-shared file and/or the identification information. At this time, the receiving terminal may only output the target object, or output the target object and the to-be-shared file, or output the target object and the identification information, or output the target object, the to-be-shared file, and the identification information, and of course, it may also include other information. When outputting the target object and the to-be-shared file at the same time, the identification information may be combined, for example, in combination with the position information of the target object in the to-be-shared file, the target object may be output in the to-be-shared file. Alternatively, an output area may be divided into multiple sub-areas, and the target object, the to-be-shared file, and even the identification information may be output in different sub-areas at the same time.

The processing method provided in the embodiments of the present disclosure can realize multiple output methods of the target objects, and can be applied to various application scenarios with different requirements.

In some embodiments, the method may further include the following processes.

S103, obtaining the to-be-shared file, the file property information of the target file, and the operating parameters of the receiving terminal.

S104, determining the output parameters of the target object based on the operating parameters and/or the file property information to directly output the target object based on the determined output parameters and/or output the target object in the to-be-shared file.

In the embodiments of the present disclosure, the output parameters of the target object may be determined by the receiving terminal, and the output parameters of the target object may also be determined by the sending terminal and the server. The output parameters may include information such as the output position, output size, output method, output volume, brightness, etc. Take the sending terminal as an example. The sending terminal may obtain the configuration parameters and/or the operating parameters of the receiving terminal, and determine the output parameters of the target object based on the type of the to-be-shared file. For example, the to-be-shared file is an image, the target file is also an image, and the application used to display the image at the receiving terminal is in an idle state. At this time, the output parameters determined by the sending terminal may be to output the target object (or output the target object in the to-be-shared file) on the display screen of the receiving terminal in the original scale and by using a pop-out output method with an output duration of 2 seconds. In another example, the to-be-shared file is an audio clip, the target file is also an audio clip, and the application to replay the audio clip in being used by the user at the receiving terminal. At this time, the output parameters determined by the sending terminal may be to add the target object or the to-be-shared file to a playlist, and play the target object or the to-be-shared file after the audio clip being played at the receiving terminal is played.

Consistent with the present disclosure, by obtaining the file property information of the to-be-shared file and the target file, and combining the file property information, the operating parameters of the receiving terminal, and other information, the output parameters of the target object can be determined, such that the receiving terminal can output based on the output method determined by the sending terminal. In this way, not only the content shared by the sending terminal can be shared to the receiving terminal, but at the same time, the receiving terminal user can view the shared content based on the output parameters determined by the sending terminal, thereby eliminating the user operation at the receiving terminal, which can reduce the number of operations of the receiving terminal user.

An example application of an embodiments of the present disclosure in an actual application scenario will be described below.

Take the to-be-shared file is sent to an instant messaging APP installed on a second terminal based on the instant messaging APP installed in a first terminal as an example.

For example, user A (holding the first terminal) captures an image of a large landscape (corresponding to the to-be-shared file described above), sends it to user B (holding the second terminal), and marks the point of interest to be shared with user B (corresponding to the target object described above). After receiving the image, user B needs to move and scale the image back and forth to see the point of interest shared by user A. Especially when user A shares multiple points of interest at the same time, user B will need to perform multiple operations of moving and scaling, which is inconvenient to user B.

For the example described above, one of the technical solutions is for user A to take screenshots of each point of interest to be shared, and send each screenshot to user B. Although this solution does not require user B to move and scale back and forth, it still requires user B to click on each screenshot to view the shared points of interest. In addition, this solution requires user A to take screenshots and perform the send operation for each point of interest to be shared, which is inconvenient to user A.

The embodiments of the present disclosure provide a technical solution to improve the situation described above. In this solution, user A captures the image and marks the points of interest to be shared with user B (for example, by drawing a circle at the point to interest to be shared on the image). After user B receives the image shared by user A, there is no need for user B to click, or user B only needs to click once or a few times, and the second terminal can display all the shared points of interest. In addition, when displaying each shared point of interest, the image can be automatically scaled without manual operation by the user. In this way, there is no need to capture screenshots and perform the send operation for each shared point of interest, which is convenient for user A to operate. In addition, when displaying on the second terminal, there is no need for user B to click, scale, or move each shared point of interest, which is convenient for user B to view.

Figure 3:
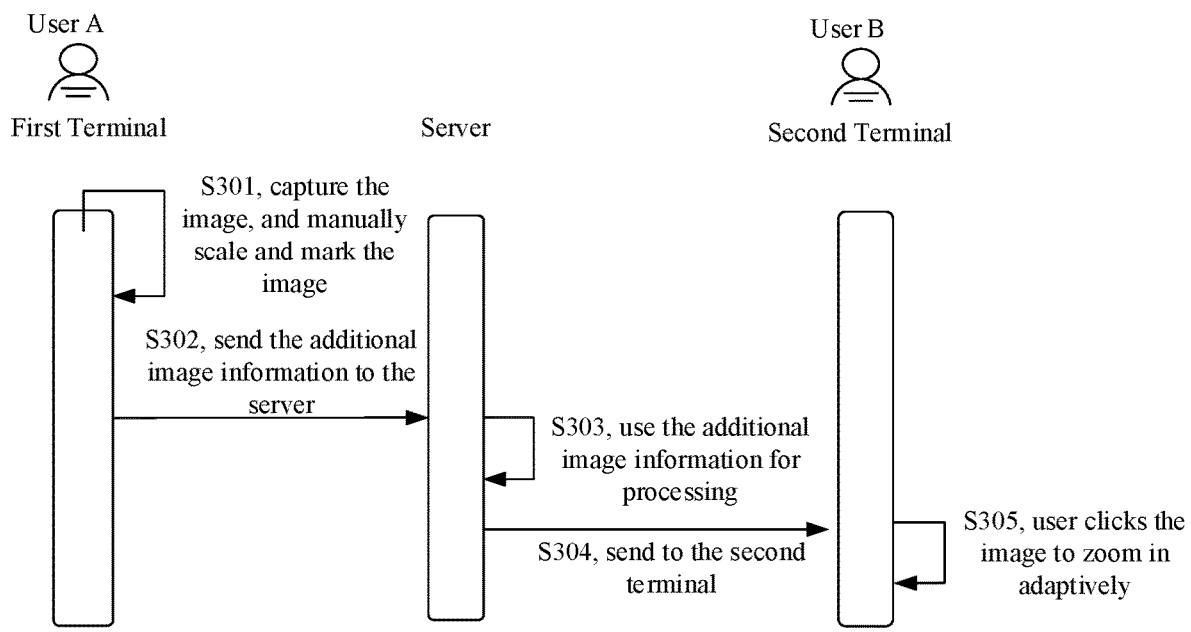
FIG. 3 is a flowchart of an automatic focusing operation of a shared image according to an embodiment of the present disclosure.

FIG. 3 is a flowchart of an automatic focusing operation of a shared image according to an embodiment of the present disclosure. The operation will be described in detail below.

S301, user A uses the first terminal to capture an image, manually scales and marks the image for processing.

User A performs an operation for triggering a photographing instruction on the first terminal, and the first terminal captures an image in response to the photographing instruction of user A to obtain the image. User A can manually scale and mark the image. The first terminal receives the operation instruction of user A to scale and mark the image, obtains the marking and processing information corresponding to the operation instruction, and determines the marking and processing information as additional information of the image.

In the embodiments of the present disclosure, the user in the image marking process can determine the position information of the marked object in the image, instead of the longitude and latitude position information of the marked object, or the geographic position information of the captured image.

When determining the additional information of the image, the area range and position information related to the image can be selected to be transmitted. When transmitting information, not only the position information of the marked object marked by the user may be transmitted, but the scaling information of the marked object by user A on the first terminal may also be transmitted.

S302, the first terminal transmits the additional image information and the image to the server.

In the embodiments of the present disclosure, the server can process the image, and the first terminal can send the additional image information and the image to the server.

S303, the server uses the additional image information to process the image to obtain the marked object.

For the implementation method of the server using the additional image information to process the image to obtain the marked object, reference can be made to the implementation method of processing the to-be-shared file described above, which will not be repeated here.

S304, server sends the marked object to the second terminal.

In some embodiments, the server may also transmit the scaling information to the second terminal as the additional image information.

S305, the second terminal receives and displays the marked object, user B clicks the marked object, and the second terminal adaptively enlarges and displays the marked object.

After processing by the server, the second terminal can adaptively scale the marked object to the size specified by user A.

An actual application scenario is described below by taking the to-be-shared file as an image as an example.

Figure 4:
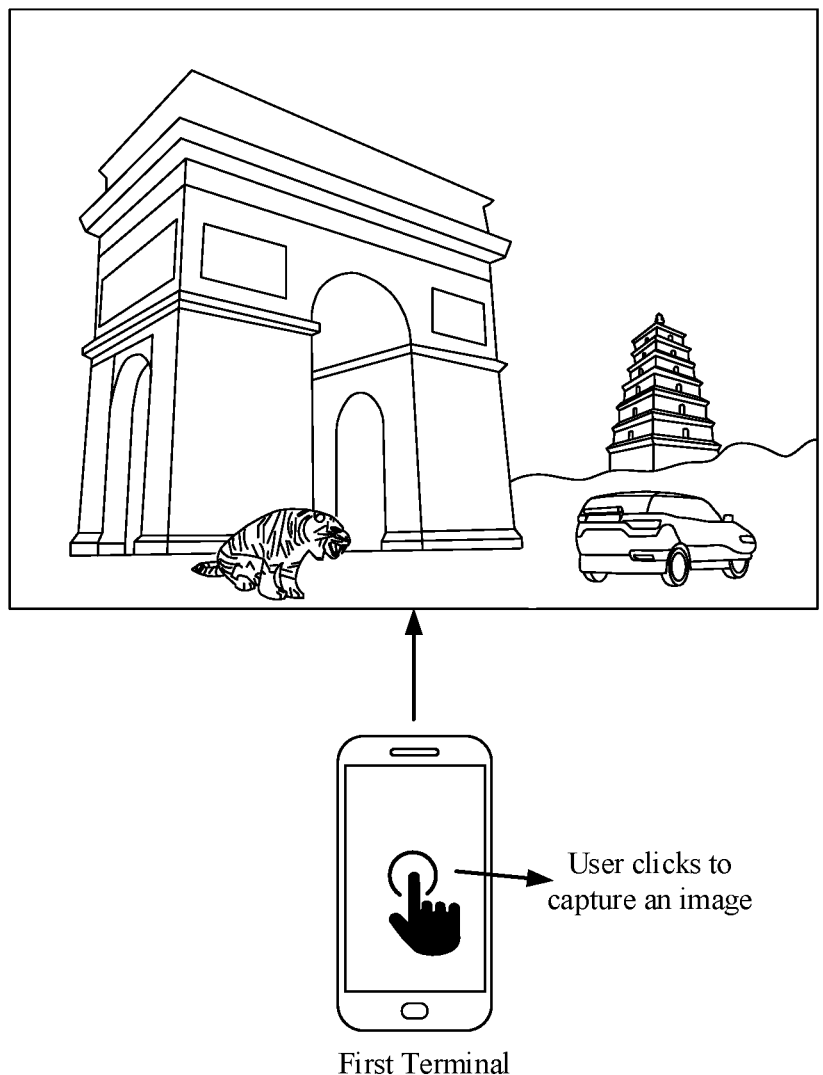
FIG. 4 is a schematic diagram of user A using a first terminal to capture an image to obtain an original image.

FIG. 4 is a schematic diagram of user A using the first terminal to capture an image to object the original image. User A clicks to capture an image, and the image acquisition device of the first terminal performs image capture to obtain the original image.

Figure 5:
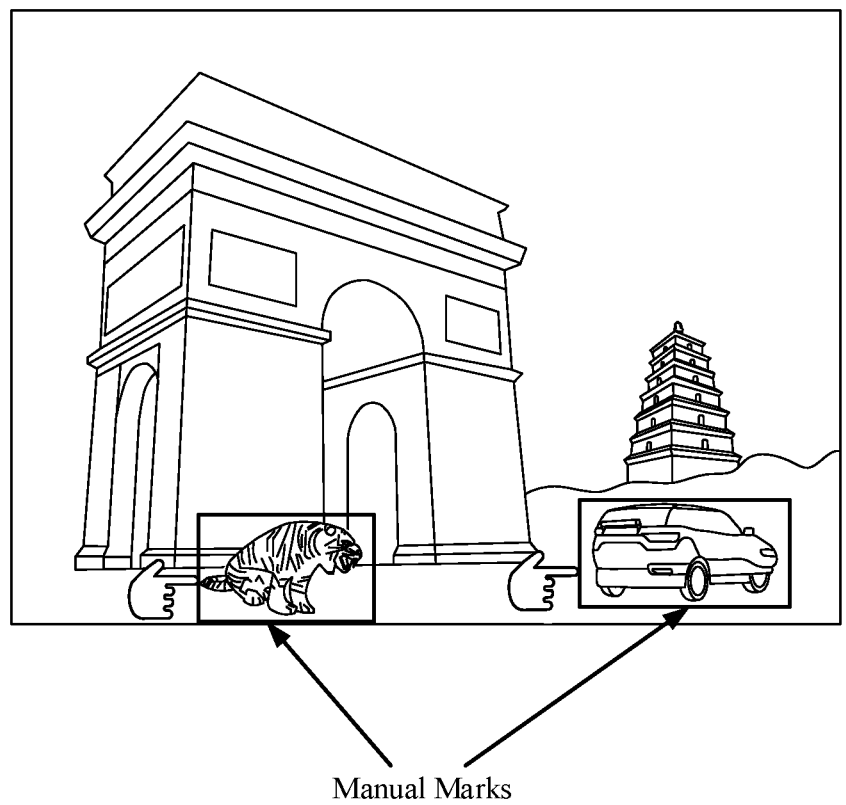
FIG. 5 is a schematic diagram of user A manually marking the image.

FIG. 5 is a schematic diagram of user A manually marking an image. As shown in FIG. 5, user A manually marks the to-be-shared objects "car" and "tiger" in the original image. After the marking is completed, a marked image is obtained, and the marked image and the original image are shared to the second terminal by using the instant messaging APP.

Figure 6:
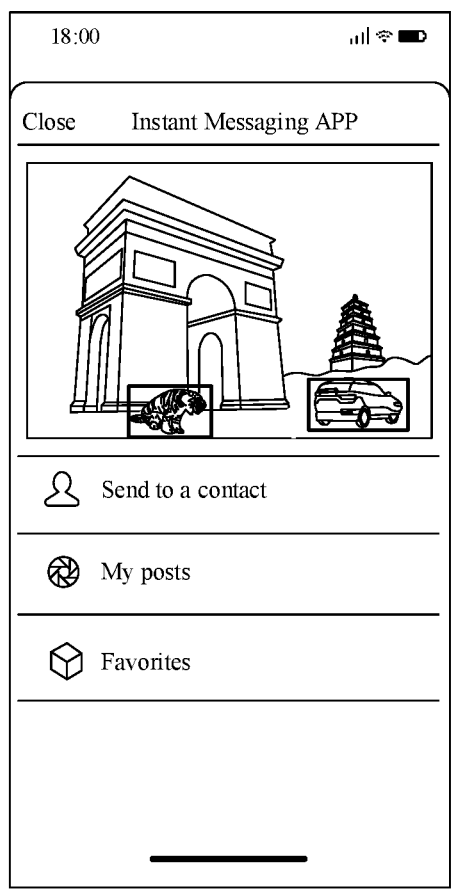
FIG. 6 is a schematic diagram of an interface for user A to share the marked image.

FIG. 6 is a schematic diagram of an interface for user A to share the marked image.

Figure 7:
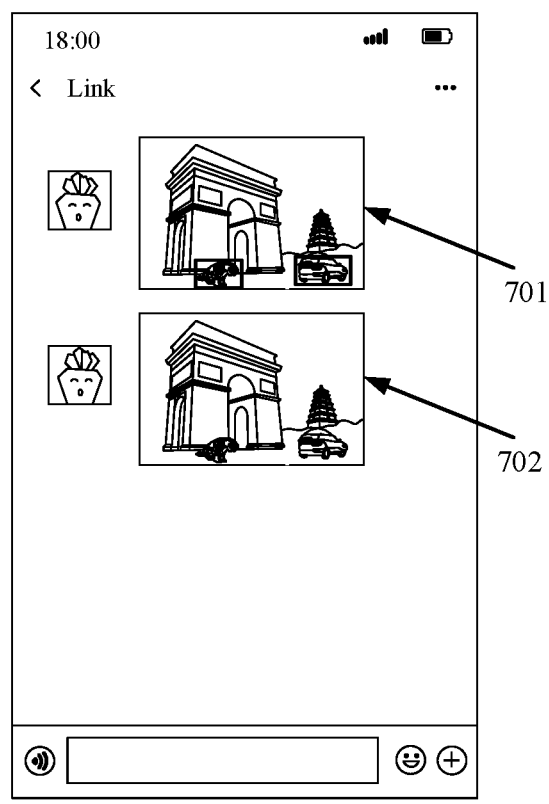
FIG. 7 is a schematic diagram of an interface of a second terminal.
Figure 8:
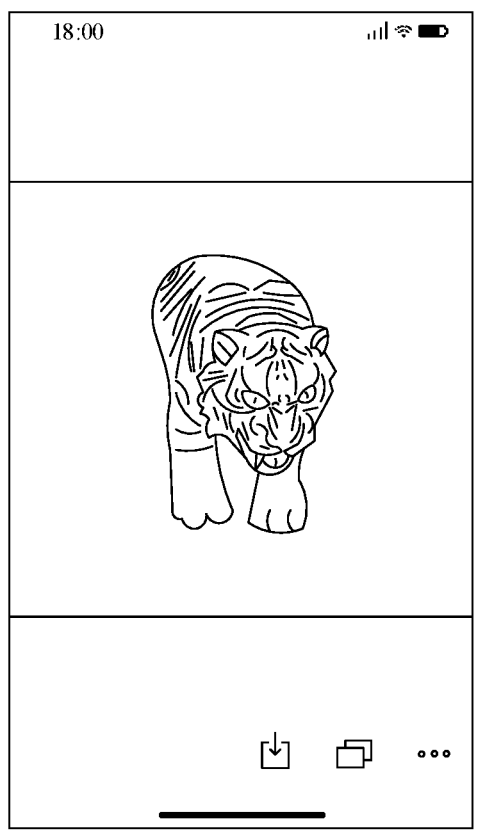
FIG. 8 is a schematic diagram of displaying a marked object on the second terminal.
Figure 9:
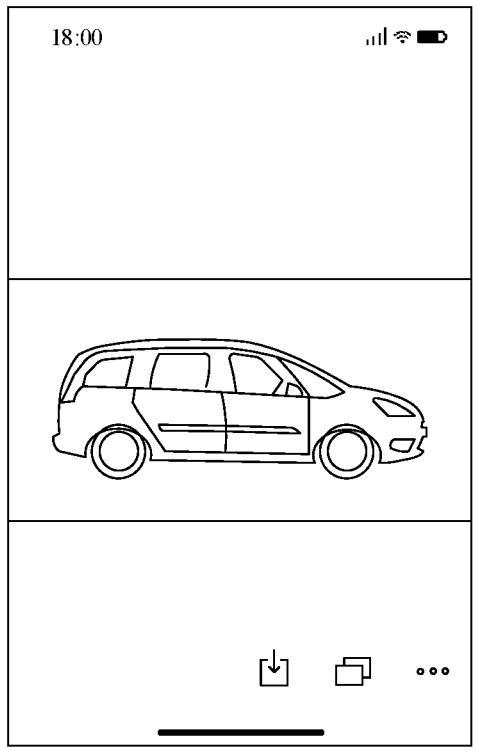
FIG. 9 is a schematic diagram of displaying the marked object on the second terminal.

FIG. 7 is a schematic diagram of an interface of the second terminal. As shown in FIG. 7, the second terminal outputs the marked image and the original image after receiving these images, where 701 indicates the marked image, and 702 indicates the original image. User B can click on the marked image, and the marked objects included in the marked image 701 can be output based on the output parameters processed by the server. For example, the output parameters processed by the server may be to automatically display the marked objects every 2 seconds. FIG. 8 and FIG. 9 are schematic diagrams of the marked objects displayed by the second terminal. When the second terminal displays the "tiger" and the "car", there is no need for user B to click or perform other manual operations, and each marked object may be automatically displayed at 2-second intervals.

After displaying the "car", the marked image 701 may be automatically displayed, and after display the marked image 701 for 2 seconds, a main image shown in FIG. 7 may be displayed.

In another example, when the to-be-shared file is an audio clip, the operations of sharing the audio clip may be the same as the operations of sharing the image shown in FIG. 3. After obtaining the original audio clip, the original audio clip may be marked to obtain a marked audio clip, and the marked audio clip may be sent to the server. After the server receives the marked audio clip, a lower compression rate for the bits of the marked audio segment may be reserved, such that the receiver can receive higher-quality audio and user B can hear a clearer sound.

In the embodiments of the present disclosure, the server may prioritize the marked image and the marked audio clip, and at the same time send the marked image and the marked audio clip first, such that the receiver can receive the marked image and the marked audio clip sooner.

Based on the foregoing embodiments, an embodiment of the present disclosure provides a processing device. The modules included in the processing device and the units included in each module may be implemented by a processor in a computer device. Of course, the modules included in the control device and the units included in each module may also be implemented by specific logic circuits. In the implementation process, the processor can be a central processing unit (CPU), a microprocessor (MPU), a digital signal processor (DSP), or a field programmable gate array (FPGA), etc.

Figure 10:
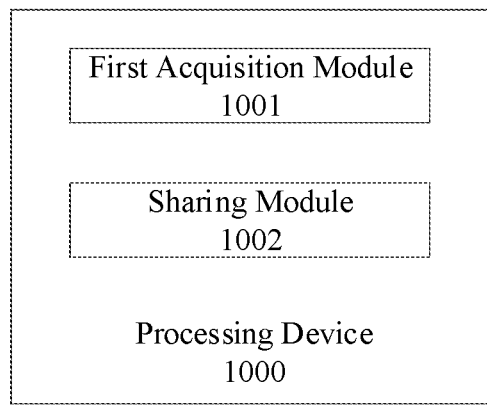
FIG. 10 is a structural diagram of a processing device according to an embodiment of the present disclosure.

FIG. 10 is a structural diagram of a processing device 1000 according to an embodiment of the present disclosure. As shown in FIG. 10, the processing device 1000 includes a first acquisition module 1101, configured to obtain the to-be-shared file and its identification information, where the identification information may be used to indicate a target object in the to-be-shared file; and a sharing module 1002, configured to share the to-be-shared file from the sending terminal to the receiving terminal in response to obtaining a sharing operation that satisfies a condition, such that the receiving terminal can output at least the target object obtained by processing the to-be-shared file.

In some embodiments, the sharing module 1002 may include a first sharing unit, configured to share the to-be-shared file to the receiving terminal after the to-be-shared file is processed by the sending terminal, such that the receiving terminal may output at least the target object obtained by processing the to-be-shared file; or a first sending unit, configured to send the to-be-shared file from the sending terminal to the server for processing, and then share it to the receiving terminal, such that the receiving terminal may output at least the target object obtained by processing the to-be-shared file; or a second sharing unit, configured to process the to-be-shared file at the receiving terminal after the to-be-shared file is shared from the sending terminal to the receiving terminal, such that the receiving terminal may output at least the target object obtained by processing the to-be-shared file.

In some embodiments, the sharing module 1002 may include a first acquisition module, configured to obtain the first reference information if there is a first communication connection between the sending terminal and the receiving terminal, and determine whether the sending terminal and/or the receiving terminal process the to-be-shared file based on at least the first reference information, such that the receiving terminal may output at least the target object. In some embodiments, the first reference information may at least indicate the configuration parameters and/or the operating parameters of the sending terminal and/or the receiving terminal. Alternatively, the sharing module 1002 may include a second acquisition unit, configured to obtain the second reference information if the sending terminal and the receiving terminal communicate through the server, and determine at least one of the receiving terminal, the server, or the receiving terminal processes the to-be-shared file based on at least the second reference information, such that the receiving terminal may output at least the target object. In some embodiments, the second reference information may indicate configuration parameters and/or configuration parameters of at least one of the sending terminal, the server, or the receiving terminal.

In some embodiments, the first acquisition module 1001 may include an identification unit, configured to identify the editing information of the content carried by the to-be-shared file to obtain the identification information; and/or, a data analysis unit, configured to analyze the obtained editing information for the to-be-shared file or the interaction data between the sending terminal and the receiving terminal to obtain the identification information.

In some embodiments, the first sharing unit may further include a first determination subunit, configured to determine the position information of the target object in the to-be-shared file based on the identification information; or, a second determination unit, configured to determine multiple pieces of position information of the target objects in the to-be-shared file based on the identification information, and associate the multiple pieces of position information in a first association manner; or, an editing processing subunit, configured to edit the to-be-shared file based on the to-be-shared file to obtain the target object; or, a first search subunit, configured to search for a matching object locally or on the cloud based on the identification information to obtain the target object. The first sharing unit may further include a second search subunit, configured to edit the to-be-shared file or search outside the to-be-shared file based on the identification information. If multiple target objects are obtained, the multiple obtained target objects may be associated based on the second association manner.

In some embodiments, the sharing module 1002 may be further configured to cause the receiving terminal to directly output the target object based on at least the target file indicating the target object, and/or output the identification information in the to-be-shared file based on the position information; or, directly output the target object based on the identification information and/or the obtained output instruction for the target object, and/or output the target object in the to-be-shared file based on the position information; or, obtained the configuration parameters and the operating parameters of the receiving terminal, and directly output the target object based on the configuration parameters and the operating parameters, and/or output the target object in the to-be-shared file based on the position information.

In some embodiments, the processing device 1000 may further include a second acquisition module, configured to obtain the to-be-shared file, the file property information of the target file, and the operating parameters of the receiving terminal; or, a first determination module, configured to determine the output parameters of the target object based on the operating parameters and/or the file property information to directly output the target object based on the determined output parameters and/or output the target object in the to-be-shared file.

In some embodiments, the processing device 1000 may further include an identification module, configured to identify the identification information and determine the to-be-matched feature of the target object, the to-be-matched feature including one of an image feature, a sound feature, and a text feature; a feature matching module, configured to match the to-be-matched feature with the object included in the to-be-shared file to obtain a matching result; and a second determination module, configured to determine an object whose matching result is a successful match as the target object indicated by the identification information.

It is to be noted here that the description of the above processing device embodiment is similar to the description of the above method embodiments. The processing device embodiment has similar advantageous effects with those of the method embodiments and thus the description thereof will be omitted here. For those technical details not mentioned in the above processing device embodiment, reference can be made to the description of the above method embodiments and the description thereof will be omitted here for simplicity.

It should be noted that, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc. In this way, the embodiments of the present disclosure are not limited to any specific combination of hardware and software.

Correspondingly, an embodiment of the present disclosure provides a computer-readable storage medium having a computer program stored thereon. When the computer program is executed by a processor, the processes in the processing method described in the foregoing embodiments can be implemented.

Figure 11:
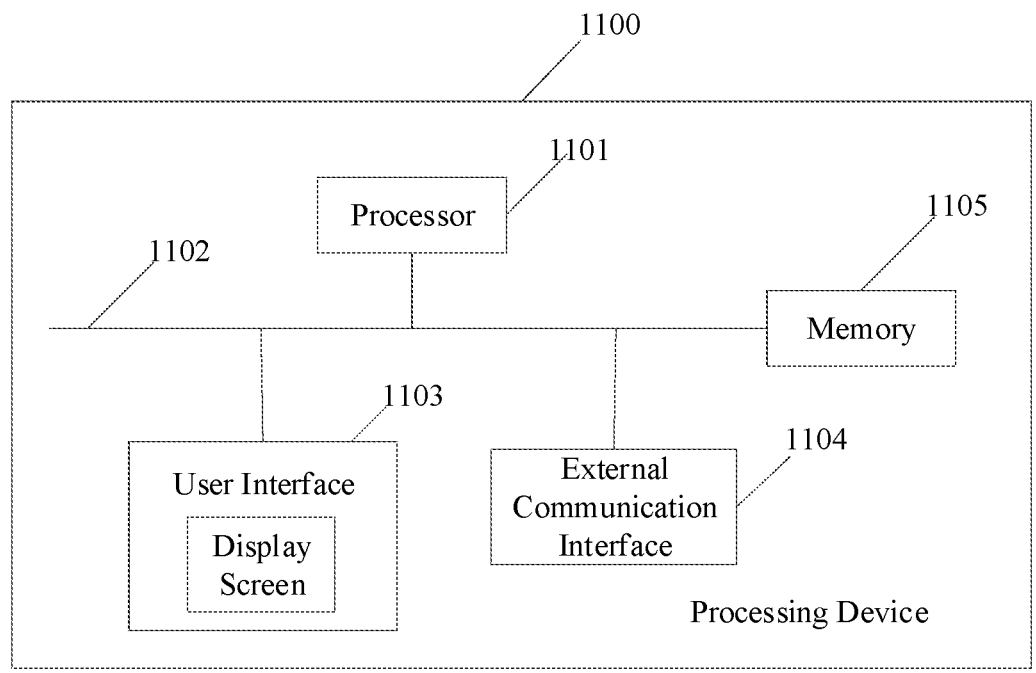
FIG. 11 is a structural diagram of the processing device according to an embodiment of the present disclosure.

An embodiment of the present disclosure provides a processing device. FIG. 11 is a structural diagram of a processing device 1100 according to an embodiment of the present disclosure. As shown in FIG. 11, the processing device 1100 includes a processor 1101, at least one communication bus 1102, a user interface 1103, at least one external communication interface 1104, and a memory 1105. In some embodiments, the communication bus 1102 may be configured to implement the connections and communications between these components. The user interface 1103 may include a display screen, and the external communication interface 1104 may include a standard wired interface and a wireless interface. The processor 1101 may be configured to execute the program instructions of the processing method stored in the memory, thereby implementing the processes in the processing method provided in the foregoing embodiments.

It is to be noted here that the descriptions of the above processing device and storage medium embodiments are similar to the description of the above method embodiments. The processing device and storage medium embodiments have similar advantageous effects with those of the method embodiments and thus the description thereof will be omitted here. For those technical details not mentioned in the above processing device and storage medium embodiments, reference can be made to the description of the above method embodiments and the description thereof will be omitted here for simplicity.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit play or may not be a physical unit. The units can be located in a same place or distributed on multiple network units. Some or all of the units can be chosen to realize purpose of the disclosure according to actual need.

Further, various functional units can be all integrated in one processing unit or be separate, individual units. Two or more units can be integrated in one unit. A unit can be implemented by hardware or by a combination of hardware and software.

It is understood by persons of ordinary skill in the art that all or some of the processes consistent with the disclosure can be implemented by hardware as instructed by a program, which can be stored in a non-transitory computer-readable storage medium. The program, when executed, can cause, for example, a processor to perform a method consistent with the disclosure, such as one of the examples of the methods described above. The storage medium can include a medium that can store program codes, such as a mobile storage, a read only memory (ROM), a diskette, or a compact disc.

Further, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A processing method comprising:
   obtaining a to-be-shared file and identification information of the to-be-shared file, the identification information indicating a target object in the to-be-shared file, the to-be-shared file including at least one of an image file, a voice file, or a document, and the target object including at least one of an image area in the image file, an audio clip in the voice file, or a text segment in the document; and
   in response to obtaining a sharing operation that satisfies a condition, sharing the to-be-shared file from a sending terminal to a receiving terminal to cause the receiving terminal to output at least the target object obtained by processing the to-be-shared file, the target object being obtained by scaling up a part of the to-be-shared file based on the identification information to a specified size for outputting at the receiving terminal;
   wherein obtaining the identification information of the to-be-shared file includes:
   analyzing interaction data between the sending terminal and the receiving terminal to obtain the identification information, the interaction data including at least one of a context of an instant message sent by the sending terminal to the receiving terminal or description information for the to-be-shared file.

2. The method of claim 1, wherein sharing the to-be-shared file from the sending terminal to the receiving terminal to cause the receiving terminal to output at least the target object obtained by processing the to-be-shared file includes:
   processing the to-be-shared file at the sending terminal and sending the processed to-be-shared file to the receiving terminal to cause the receiving terminal to output at least the target object obtained by processing the to-be-shared file; or,
   sending the to-be-shared file from the sending terminal to a server for processing and sharing the processed to-be-shared file to the receiving terminal to cause the receiving terminal to output at least the target object obtained by processing the to-be-shared file; or,
   using the receiving terminal to process the to-be-shared file after the to-be-shared file is shared from the sending terminal to the receiving terminal to cause the receiving terminal to output at least the target object obtained by processing the to-be-shared file.

3. The method of claim 1, wherein sharing the to-be-shared file from the sending terminal to the receiving terminal to cause the receiving terminal to output at least the target object obtained by processing the to-be-shared file includes:
   obtaining first reference information if there is a first communication connection between the sending terminal and the receiving terminal, and determining that the sending terminal or the receiving terminal is to process the to-be-shared file based on at least the first reference information, to cause the receiving terminal to output at least the target object, the first reference information indicating:
      a plurality of configuration parameters or a plurality of operating parameters of the sending terminal, or
      a plurality of configuration parameters or a plurality of operating parameters of the receiving terminal; or
   obtaining second reference information if the sending terminal and the receiving terminal communicates through the server, and determining at least one of the sending terminal, the server, or the receiving terminal to process the to-be-shared file based on at least the second reference information to cause the receiving terminal to output at least the target object, the second reference information indicating the configuration parameters and/or the operating parameters of at least one of the sending terminal, the server, or the receiving terminal.

4. The method of claim 1, wherein obtaining the identification information of the to-be-shared file further includes:
   identifying editing information of content carried by the to-be-shared file to obtain the identification information; and/or
   analyzing the description information for the to-be-shared file to obtain the identification information.

5. The method of claim 4, wherein processing the to-be-shared file includes:
   determining position information of the target object in the to-be-shared file based on the identification information; or
   determining multiple pieces of position information of the target object in the to-be-shared file based on the identification information, and associating the multiple pieces of position information in a first association manner; or editing the to-be-shared file based on the identification information to obtain the target object; or searching for a matching object locally or on a cloud based on the identification information to obtain the target object; or editing the to-be-shared file or searching outside the to-be-shared file based on the identification information, and associating multiple target objects in a second association manner if multiple target objects are obtained.

6. The method of claim 4, wherein:

processing the to-be-shared file includes:

determining position information of the target object in the to-be-shared file based on the identification information; and causing the receiving terminal to output at least the target object obtained by processing the to-be-shared file includes:

causing the receiving terminal to directly output the target object based on at least a target file indicating the target object, and/or outputting the target object in the to-be-shared file based on the position information.

7. The method of claim 6, wherein causing the receiving terminal to output at least the target object obtained by processing the to-be-shared file includes:

outputting the target object directly based on the identification information and/or an obtained output instruction for the target object, and/or outputting the target object in the to-be-shared file based on the position information; or obtaining configuration parameters and operating parameters of the receiving terminal, and directly outputting the target object based on the configuration parameters and the operating parameters, and/or outputting the target object in the to-be-shared file based on the position information.

8. The method of claim 6, further comprising:

obtaining the to-be-shared file, file property information of the target file, and the operating parameters of the receiving terminal, and determining a plurality of output parameters of the target object based on the operating parameters of the receiving terminal and/or the file property information of the target file to directly output the target object based on the determined output parameters and/or output the target object in the to-be-shared file.

9. The method of claim 1, further comprising:

identifying the identification information and determining a to-be-matched feature, the to-be-matched feature including one of an image feature, a sound feature, and a text feature;

matching the to-be-matched feature with the target object included in the to-be-shared file to obtain a matching result; and determining an object whose matching result is a successful match as the target object indicated by the identification information.

10. The method of claim 1, wherein sharing the to-be-shared file from the sending terminal to the receiving terminal to cause the receiving terminal to output at least the target object obtained by processing the to-be-shared file includes:

sharing the to-be-shared file from the sending terminal to the receiving terminal via an instant message, to cause the receiving terminal to output at least the target object as the instant message.

11. The method of claim 1, wherein the target object is further obtained by searching a matching object locally or on a cloud based on the identification information.

12. A processing device comprising:

a first acquisition module configured to obtain a to-be-shared file and identification information of the to-be-shared file, the identification information indicating a target object in the to-be-shared file, the to-be-shared file including at least one of an image file, a voice file, or a document, and the target object including at least one of an image area in the image file, an audio clip in the voice file, or a text segment in the document; and a sharing module configured to, in response to obtaining a sharing operation that satisfies a condition, share the to-be-shared file from a sending terminal to a receiving terminal to cause the receiving terminal to output at least the target object obtained by processing the to-be-shared file, the target object being obtained by scaling up a part of the to-be-shared file based on the identification information to a specified size for outputting at the receiving terminal;

wherein the first acquisition module includes a data analysis unit, the data analysis unit being configured to analyze interaction data between the sending terminal and the receiving terminal to obtain the identification information, the interaction data including at least one of a context of an instant message sent by the sending terminal to the receiving terminal or description information for the to-be-shared file.

13. The device of claim 12, wherein the sharing module includes:

a first sharing unit, the first sharing unit being configured to process the to-be-shared file at the sending terminal and send the processed to-be-shared file to the receiving terminal to cause the receiving terminal to output at least the target object obtained by processing the to-be-shared file; or, a first sending unit, the first sending unit being configured to send the to-be-shared file from the sending terminal to a server for processing and share the processed to-be-shared file to the receiving terminal to cause the receiving terminal to output at least the target object obtained by processing the to-be-shared file; or, a second sharing unit, the second sharing unit being configured to use the receiving terminal to process the to-be-shared file after the to-be-shared file is shared from the sending terminal to the receiving terminal to cause the receiving terminal to output at least the target object obtained by processing the to-be-shared file.

14. The device of claim 12, wherein the sharing module further includes:

a first acquisition unit, the first acquisition unit being configured to obtain first reference information if there is a first communication connection between the sending terminal and the receiving terminal, and determine that the sending terminal or the receiving terminal is to process the to-be-shared file based on at least the first reference information, to cause the receiving terminal to output at least the target object, the first reference information indicating:

a plurality of configuration parameters or a plurality of operating parameters of the sending terminal, or a plurality of configuration parameters or a plurality of operating parameters of the receiving terminal; or a second acquisition unit, the second acquisition unit being configured to obtain second reference information if the sending terminal and the receiving terminal communicates through the server, and determine at least one of the sending terminal, the server, or the receiving terminal to process the to-be-shared file based on at least the second reference information to cause the receiving terminal to output at least the target object, the second reference information indicating the configuration parameters and/or the operating parameters of at least one of the sending terminal, the server, or the receiving terminal.

15. The device of claim 13, wherein the first sharing unit further includes:

a first determination subunit, the first determination subunit being configured to determine position information of the target object in the to-be-shared file based on the identification information; or a second determination subunit, the second determination subunit being configured to determine multiple pieces of position information of the target object in the to-be-shared file based on the identification information, and associate the multiple pieces of position information in a first association manner; or an editing processing subunit, the editing processing subunit being configured to edit the to-be-shared file based on the identification information to obtain the target object; or a first search subunit, the first search subunit being configured to search for a matching object locally or on a cloud based on the identification information to obtain the target object; or a second search subunit, the second search subunit being configured to edit the to-be-shared file or search outside the to-be-shared file based on the identification information, and associate multiple target objects in a second association manner if multiple target objects are obtained.

16. The device of claim 12, wherein:

the first sharing unit further includes:
a first determination subunit, the first determination subunit being configured to determine position information of the target object in the to-be-shared file based on the identification information; and the sharing module is further configured to:
cause the receiving terminal to directly output the target object based on at least a target file indicating the target object, and/or output the target object in the to-be-shared file based on the position information.

17. The device of claim 16, wherein the sharing module is further configured to:

output the target object directly based on the identification information and/or an obtained output instruction for the target object, and/or output the target object in the to-be-shared file based on the position information; or obtain configuration parameters and operating parameters of the receiving terminal, and directly outputting the target object based on the configuration parameters and the operating parameters, and/or output the target object in the to-be-shared file based on the position information.

18. The device of claim 12, further comprising:

an identification module configured to identifying the identification information and determining a to-be-matched feature, the to-be-matched feature including one of an image feature, a sound feature, and a text feature;

a feature matching module configured to match the to-be-matched feature with the target object included in the to-be-shared file to obtain a matching result; and a second determination module configured to determine an object whose matching result is a successful match as the target object indicated by the identification information.

19. A processing device comprising:

a processor; and a memory storing program instructions that, when being executed by the processor, cause the processor to:

obtain a to-be-shared file and identification information of the to-be-shared file, the identification information indicating a target object in the to-be-shared file, the to-be-shared file including at least one of an image file, a voice file, or a document, and the target object including at least one of an image area in the image file, an audio clip in the voice file, or a text segment in the document; and share the to-be-shared file from a sending terminal to a receiving terminal to cause the receiving terminal to output at least the target object obtained by processing the to-be-shared file in response to obtaining a sharing operation that satisfies a condition, the target object being obtained by scaling up a part of the to-be-shared file based on the identification information to a specified size for outputting at the receiving terminal;

wherein obtaining the identification information of the to-be-shared file includes:

analyzing interaction data between the sending terminal and the receiving terminal to obtain the identification information, the interaction data including at least one of a context of an instant message sent by the sending terminal to the receiving terminal or description information for the to-be-shared file.

20. The device of claim 19, wherein the program instructions further cause the processor to:

process the to-be-shared file at the sending terminal and send the processed to-be-shared file to the receiving terminal to cause the receiving terminal to output at least the target object obtained by processing the to-be-shared file; or, send the to-be-shared file from the sending terminal to a server for processing and share the processed to-be-shared file to the receiving terminal to cause the receiving terminal to output at least the target object obtained by processing the to-be-shared file; or, use the receiving terminal to process the to-be-shared file after the to-be-shared file is shared from the sending terminal to the receiving terminal to cause the receiving terminal to output at least the target object obtained by processing the to-be-shared file.

* * * * *